United States Patent [19]
Tsubaki et al.

[11] Patent Number: 5,712,737
[45] Date of Patent: Jan. 27, 1998

[54] METHOD AND APPARATUS FOR AUTOMATICALLY EDITING AUDIO SIGNALS

[75] Inventors: Masami Tsubaki, Tokyo; Shuhei Kanaoka, Kanagawa; Koji Kosaka, Kanagawa; Yoshiyuki Yahagi, Kanagawa; Toshiyuki Yamazaki, Kanagawa; Hiromi Inoue, Kanagawa; Kaoru Sekigawa, Kanagawa; Takeshi Ishihara, Kanagawa, all of Japan

[73] Assignee: Sony Corporation, Tokyo, Japan

[21] Appl. No.: 701,541

[22] Filed: Aug. 22, 1996

Related U.S. Application Data

[63] Continuation of Ser. No. 370,557, Jan. 9, 1995, abandoned, which is a continuation of Ser. No. 96,373, Jul. 26, 1993, abandoned.

[30] Foreign Application Priority Data

Jul. 28, 1992 [JP] Japan ................... 4-201560

[51] Int. Cl.⁶ ................................................. G11B 27/02
[52] U.S. Cl. ................................................. 360/13; 360/72.2
[58] Field of Search ................ 360/13, 14.1, 14.2–14.3, 360/72.1, 72.2; 358/311; 386/4, 52, 53, 55, 57, 58, 59, 60, 61, 62

[56] References Cited

U.S. PATENT DOCUMENTS

| | | | |
|---|---|---|---|
| 4,249,218 | 2/1981 | Davis et al. | 360/13 |
| 4,283,745 | 8/1981 | Kuper et al. | 360/13 |
| 4,360,843 | 11/1982 | Menezes et al. | 360/14.3 X |
| 4,507,691 | 3/1985 | Ishiguro et al. | 360/14.3 |
| 4,532,502 | 7/1985 | Menezes et al. | 360/14.1 |
| 4,858,033 | 8/1989 | Chippendale | 360/14.2 |
| 4,991,032 | 2/1991 | Staffer | 360/14.3 |
| 5,227,892 | 7/1993 | Liha | 360/13 X |
| 5,337,296 | 8/1994 | Okubo | 358/337 X |
| 5,339,393 | 8/1994 | Duffy et al. | 360/14.1 X |

FOREIGN PATENT DOCUMENTS 2-208887  8/1990  Japan.

*Primary Examiner*—Andrew L. Sniezek
*Attorney, Agent, or Firm*—Jay H. Maioli

[57] ABSTRACT

A method and an apparatus for automatically editing audio signals by determining an editing section on a recording medium having the signals recorded thereon. A first editing point is searched for on the recording medium, and the location of that point is stored in a memory. A second editing point is searched for on the recording medium. The location of the first editing point is compared with that of the second editing point. One of the two locations is set as an in-point and the other location as an out-point in accordance with the result of the comparison. The editing section determined by the in- and out-points is displayed on a screen.

4 Claims, 15 Drawing Sheets

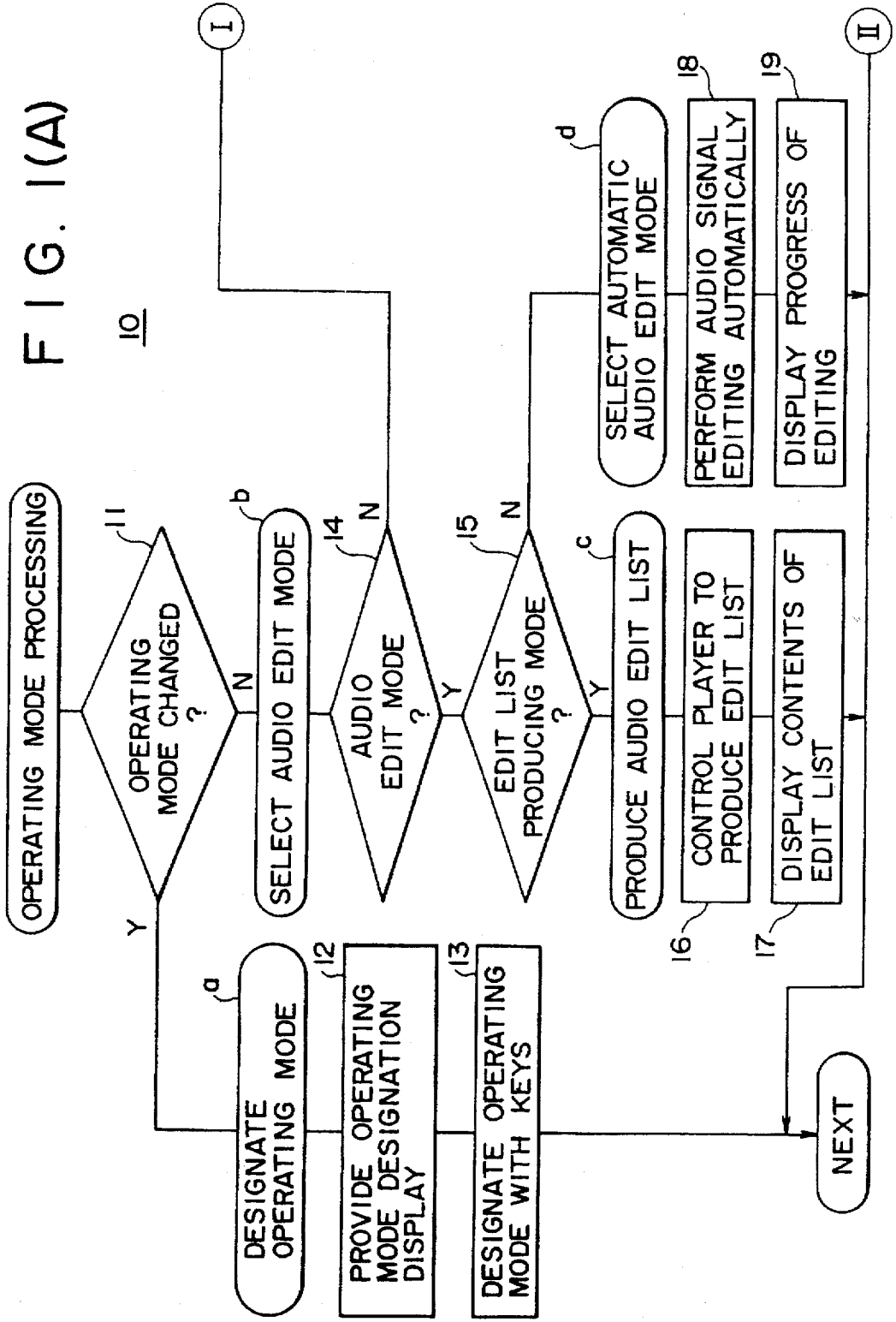

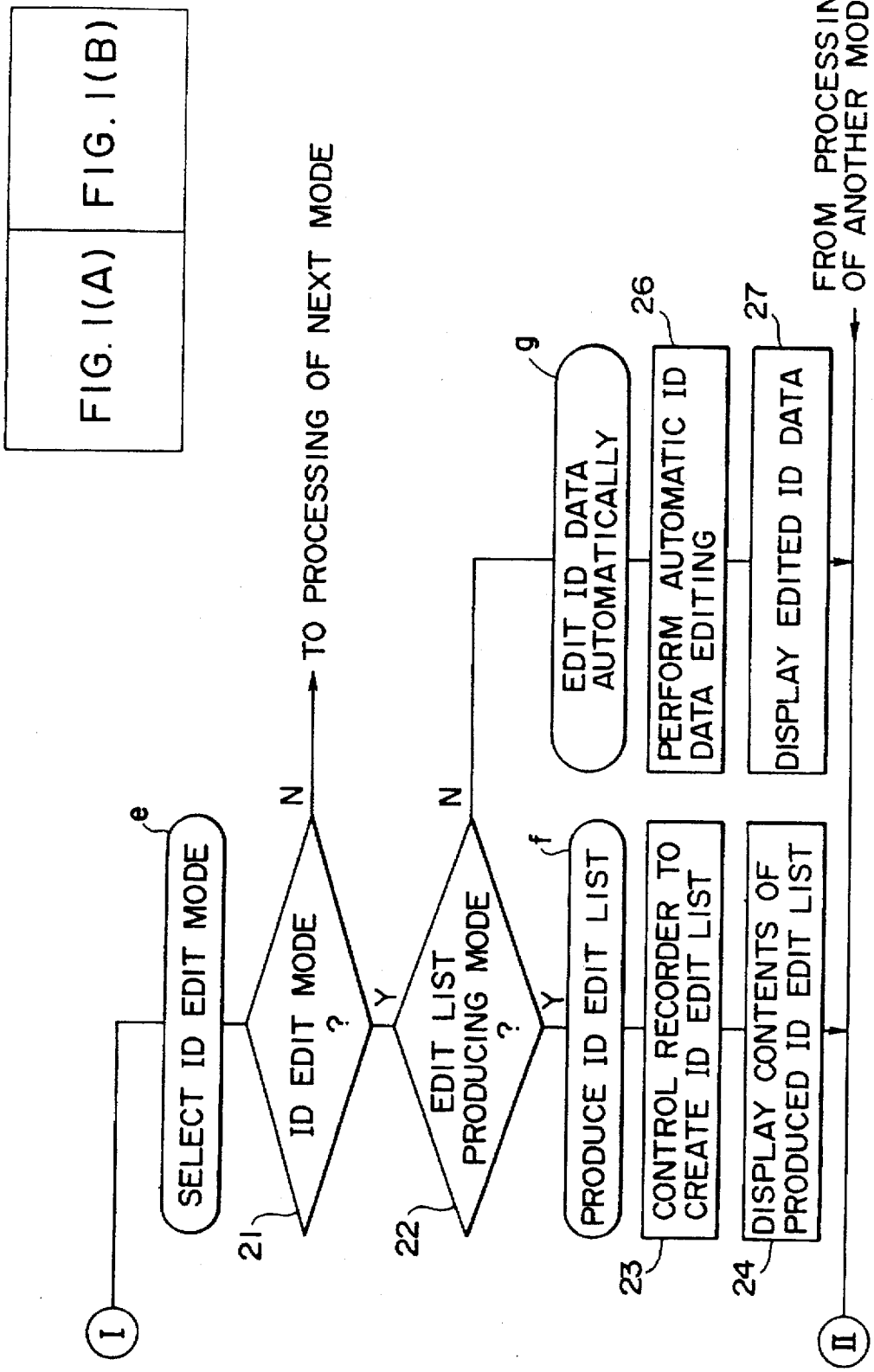

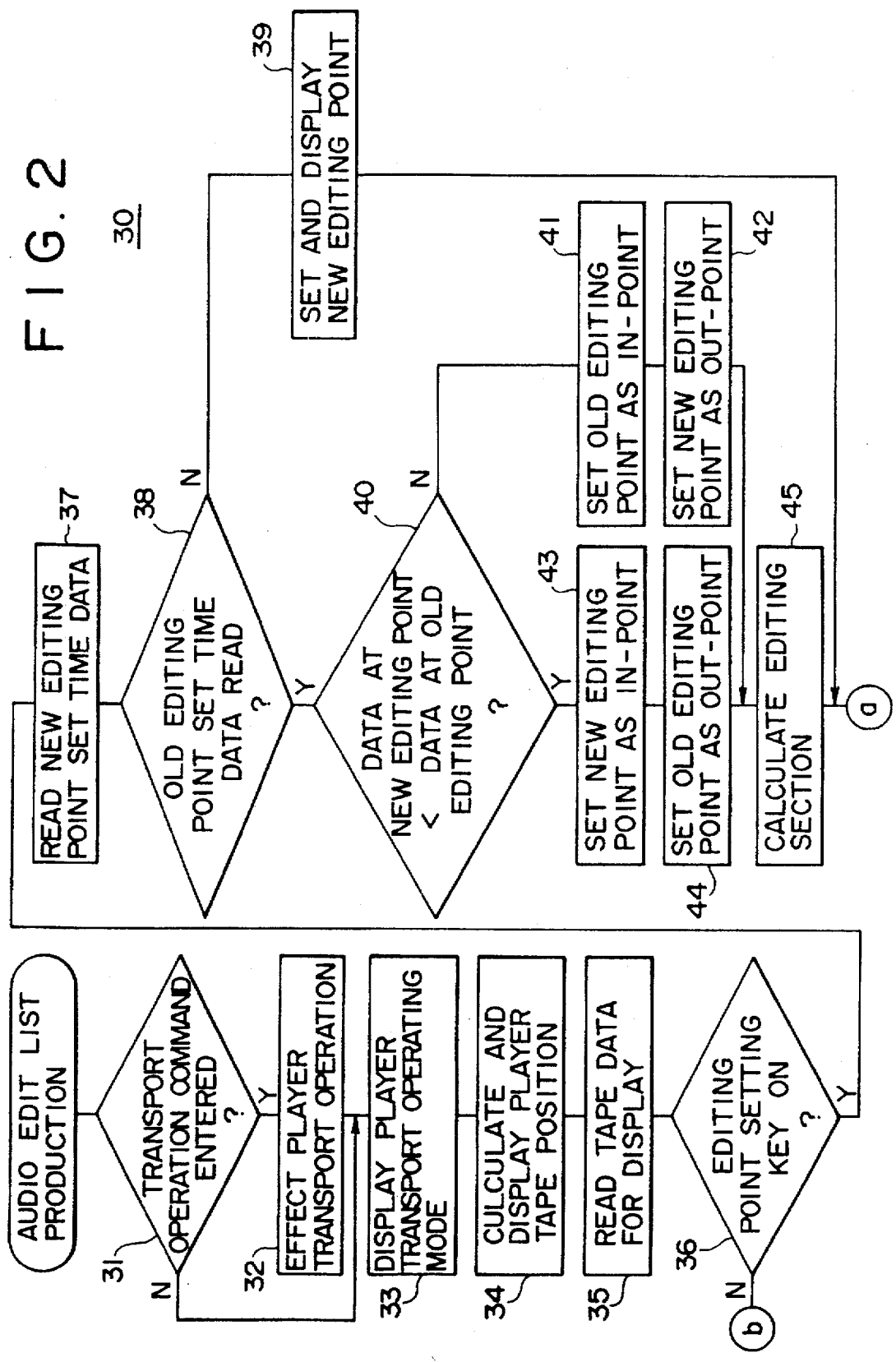

F I G. 14
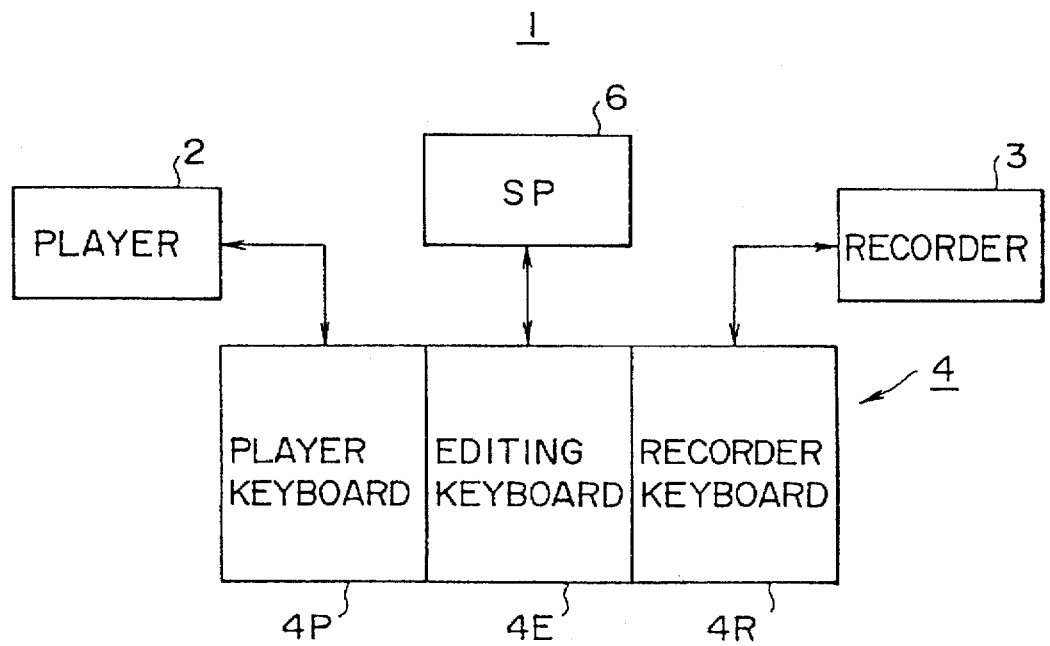
F I G. 15
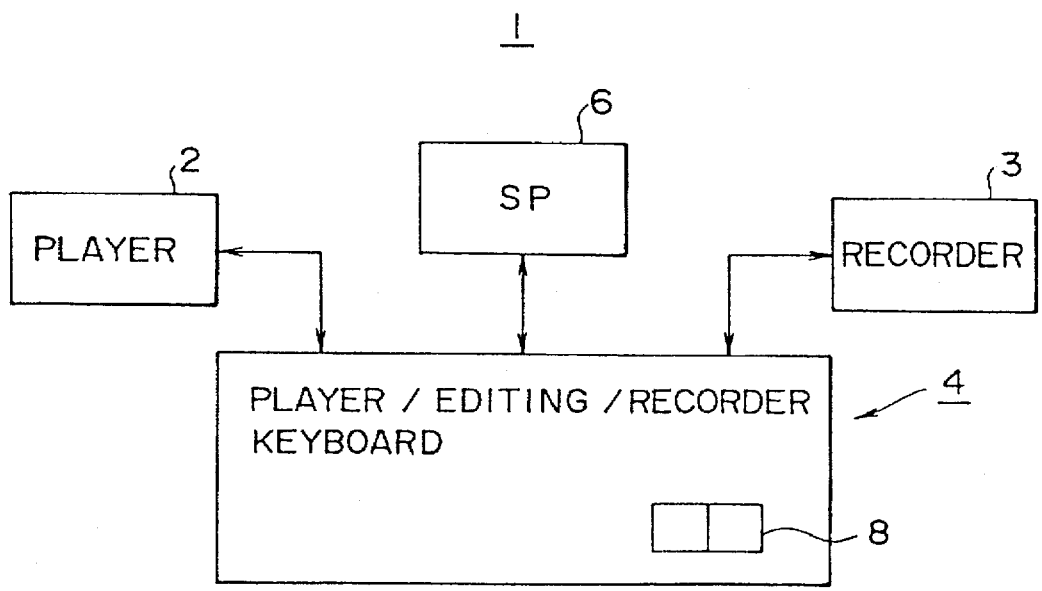

METHOD AND APPARATUS FOR AUTOMATICALLY EDITING AUDIO SIGNALS

This is a continuation of application Ser. No. 08/370,557 filed Jan. 9, 1995, which is a continuation of application Ser. No. 08/096,373 filed Jul. 26, 1993, both now abandoned.

BACKGROUND OF THE INVENTION

1. Field of the Invention

The present invention relates to a method and an apparatus for automatically editing audio signals in an easy manner.

2. Description of the Related Art

To edit audio signals requires preparing a player and a recorder which constitute a composing apparatus. The player reproduces the material to be edited (e.g., recorded tape), and the recorder records reproduced audio signals coming from the player. FIGS. 14 and 15 are a block diagrams each showing how conventional composing apparatus, indicated by reference numeral 1, is typically constituted for editing purposes.

In FIG. 14, a player 2 and a recorder 3 are connected to a common console 4. The console 4 integrally comprises a player keyboard 4P, a recorder keyboard 4R and an editing keyboard 4E. The player keyboard 4P is used exclusively with the player 2 in selecting the operating mode thereof. The recorder keyboard 4R is for dedicated use with the recorder 3, and the editing keyboard 4E is for exclusive use in editing. Reference numeral 6 indicates a speaker. Typically, the player 2 and recorder 3 are a rotary type DAT (digital audio tape recorder) each. The use of DAT's will be assumed in the description that follows.

FIG. 15 depicts an example wherein the operation keys are shared by components of the composing apparatus so as to simplify the structure of the console 4. The example includes mode changeover switches 8 that permit switching between the player 2 and the recorder 3. The remaining components are the same as those of the constitution in FIG. 14.

In editing audio signals, the composing apparatus 1 operates generally as follows:

(1) A recording medium (e.g., tape) is loaded in the recorder 3 which is then placed in pause mode. The material to be edited (e.g., recording medium such as tape) is loaded in the player 2. Editing points are searched for on the material while the latter is being reproduced.

(2) When a first editing point (i.e., in-point) is determined, an audio signal is reproduced from that point on by the player 2 in synchronism with the recorder 3 that records the reproduced audio signal. When a second recording point (i.e., out-point) is reached, the recording of the audio signal is stopped.

(3) This completes the editing of the current audio signal (i.e., a "cut"). These steps are repeated as many times as needed to compose the target audio signals into a desired edition.

As can be seen from the description above, to compose a desired batch of audio signals into an edition requires repeatedly switching between the player 2 and the recorder 3. The process is a tedious, tiresome chore. Furthermore, to set up the composing apparatus 1 requires wiring its individual components (player 2, recorder 3, console 4, etc.) correctly. The wiring is bothersome and, what is more, needs to be checked when completed for correct connection.

A first "cut" of editing is followed by as many cuts as needed, each cut carried out approximately in the same manner. This is a repetitive, timing-consuming task. Where target tapes to be edited need to be cut into pieces which are then put together in a desired order, the editor must have sufficient experience and expertise because there must be no error in cutting up the tapes. Given today's editing systems, the above and other constraints on audio signal editing discourage neophytes from casually taking up editing work.

SUMMARY OF THE INVENTION

It is therefore an object of the present invention to overcome the above and other deficiencies and disadvantages of the prior art and to provide a method and an apparatus for automatically composing audio signals into a desired edition in a simple, time-saving and efficient manner.

In carrying out the invention and according to one aspect thereof, there is provided a composing method for determining an editing section on a recording medium having signals recorded thereon, comprising the steps of: (a) searching for a first editing point on the recording medium; (b) storing the location of the first editing point in a memory; (c) searching for a second editing point on the recording medium; (d) comparing the location of the first editing point with that of the second editing point; and (e) storing one of the two locations as an in-point and the other location as an out-point in accordance with the result of the comparison. Preferably, the editing section determined by the in-point and the out-point is displayed on a display screen.

According to another aspect of the invention, there is provided a composing apparatus for determining an editing section on a recording medium having signals recorded thereon, comprising: (a) first searching means for searching for a first editing point on the recording medium; (b) first storing means for storing the location of the first editing point in a memory; (c) second searching means for searching for a second editing point on the recording medium; (d) comparing means for comparing the location of the first editing point with that of the second editing point; and (e) second storing means for storing one of the two locations as an in-point and the other location as an out-point in accordance with the result of the comparison.

According to a further aspect of the invention, there is provided a composing method for editing signals comprising the steps of: (a) selecting edit list producing mode; (b) operating a data input device for generating input data; (c) controlling a reproducing apparatus so as to reproduce signals recorded on a first recording medium in response to the input data; (d) determining the locations of edit points on the first recording medium in response to the input data; (e) storing the determined locations in a memory; (f) selecting audio edit mode; (g) reproducing signals from the first recording medium according to the locations stored in the memory; (h) recording the reproduced signals on a second recording medium by use of a recording apparatus; (i) selecting ID edit mode; (j) operating the data input device for generating input data; (k) producing identity data in response to the input data; and (l) controlling the recording apparatus so as to record the produced identity data in response to the input data.

According to an even further aspect of the invention, there is provided a composing apparatus for editing signals, comprising: (a) edit list producing mode selecting means for selecting edit list producing mode; (b) first operating means for operating a data input device for generating input data; (c) first controlling means for controlling a reproducing apparatus so as to reproduce signals recorded on a first recording medium in response to the input data; (d) determining means for determining the locations of edit points on the first recording medium in response to the input data; (e) storing means for storing the determined locations in a memory; (f) audio edit mode selecting means for selecting audio edit mode; (g) reproducing means for reproducing signals from the first recording medium according to the locations stored in the memory; (h) recording means for recording the reproduced signals on a second recording medium by use of a recording apparatus; (i) ID edit mode selecting means for selecting ID edit mode; (j) second operating means for operating the data input device for generating input data; (k) producing means for producing identity data in response to the input data; and (l) second controlling means for controlling the recording apparatus so as to record the produced identity data in response to the input data.

With the method and apparatus according to the invention, editing points are determined not by switching reproducing and recording modes for every cut but by placing into a list beforehand the editing points of each cut (e.g., process c in FIG. 1). The process involved occurs on the side of the player 2 alone.

With the edit list completed, the recorded tape to be used for each cut is loaded in the player 2. The recorder 3 is placed in recording mode. Then recording work proceeds according to the edit list (e.g., processed in FIG. 1).

When edit list producing mode is selected to edit audio signals, the player 2 of the composing apparatus 1 is placed automatically in operating mode. When audio edit mode is selected to edit audio signals automatically according to the edit list, the player 2 is placed automatically in pause and in reproducing mode and the recorder 3 is placed likewise in pause and in recording mode.

These and other objects, features and advantages of the invention will become more apparent upon a reading of the following description and appended drawings.

BRIEF DESCRIPTION OF THE DRAWINGS

FIGS. 1, 1A and 1B are flowchart,of steps in which a composing apparatus embodying the invention for automatically editing audio signals typically works;

FIG. 2 is a flowchart of steps constituting an example of producing an audio signal edit list;

FIG. 14 is a block diagram of a typical prior art composing apparatus for editing; and FIG. 15 is a block diagram of another typical prior art composing apparatus for editing.

DESCRIPTION OF THE PREFERRED EMBODIMENT

Figure 5:
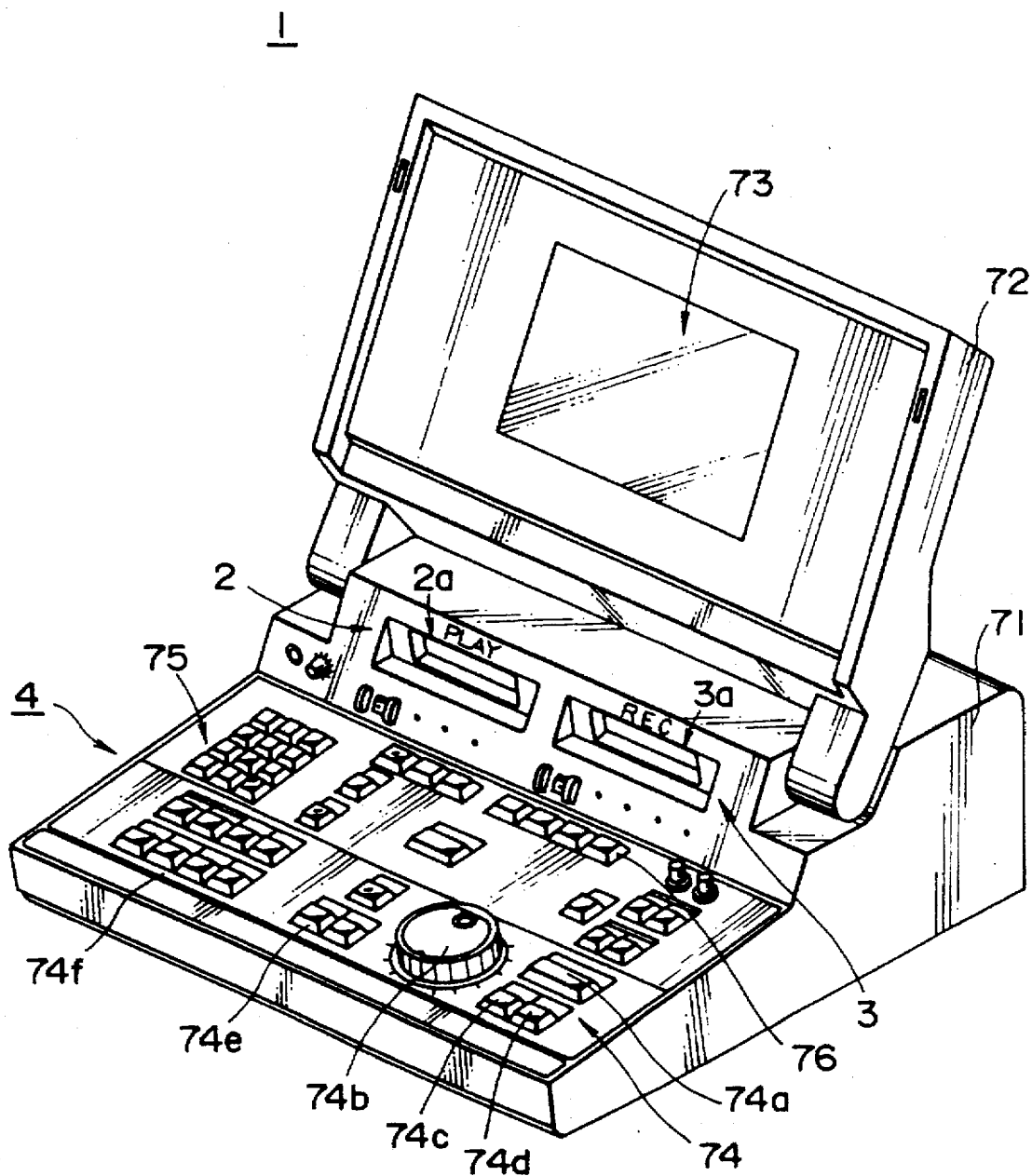
FIG. 5 is a schematic view of the composing apparatus embodying the invention.

Described below with reference to the accompanying drawings is a composing apparatus embodying the invention for automatically editing audio signals. In contrast to the typical prior art composing apparatus made up of individual audio devices, the inventive apparatus comprises its components in an integrated manner. FIG. 5 illustrates how the apparatus looks.

The composing apparatus 1 is a lap-top type device with its body 71 including a player 2 and a recorder 3 (R-DAT each in this example). The components are hidden inside; only their slots 2a and 3a for loading cassettes therethrough are exposed. A console 4 is located at the front of the apparatus 1. In terms of structure, this console resembles the one included in FIG. 15. The console 4 has a mode key 74a used to return to the menu screen in various operating modes.

The console 4 also includes a jog dial 74b and an editing point setting key 74c. The editing point setting key 74c is a single key used to determine editing points (i.e., in-and out-points). An automatic editing key 74d is used to start batch editing as per an audio signal edit list having been completed.

An editing section determining key 74e is used to determine the editing section defined by the editing points established. Pressing the key 74e establishes a desired editing section. Tape control keys 74f include various keys (PLAY, REC, CUE, etc.) for use when the player 2 or the recorder 3 is selected.

The editing keys 74 are supplemented by numeric keys 75 and function keys 76. Unlike conventional composing apparatuses, the composing apparatus 1 has neither player-recorder changeover switches (keys 8 in FIG. 5) nor dedicated keys to select individually the operating modes for the player 2 and the recorder 3.

Inside an erectable lid 72 coupled to the body 71 is a display screen 73 of a predetermined size. The screen 73 displays an edit list, the current operating mode and other data in a graphic manner.

As opposed to the prior art method of establishing the editing section for each cut and carrying out recording separately therein, the method according to the invention composes editing sections of a plurality of cuts into an edit list beforehand. With the edit list completed, dubbing work is carried out continuously to cover all editing sections listed.

FIG. 1 outlines typical steps that the composing apparatus 1 of the invention follows in performing editing work. The choice of the kind of operating mode determines whether the data selected by the console 4 are transmitted to the player 2 or to the recorder 3.

When the composing apparatus 1 is turned on, the operating mode processing routine 10 of FIG. 1 is activated. In FIG. 1, reference characters a through g are the labels of processes that will be described from now on. Operating the mode key 74a selects an operating mode. This provides an operating mode designation display (steps 11 and 12), causing the screen of FIG. 6 to appear.

Figure 6:
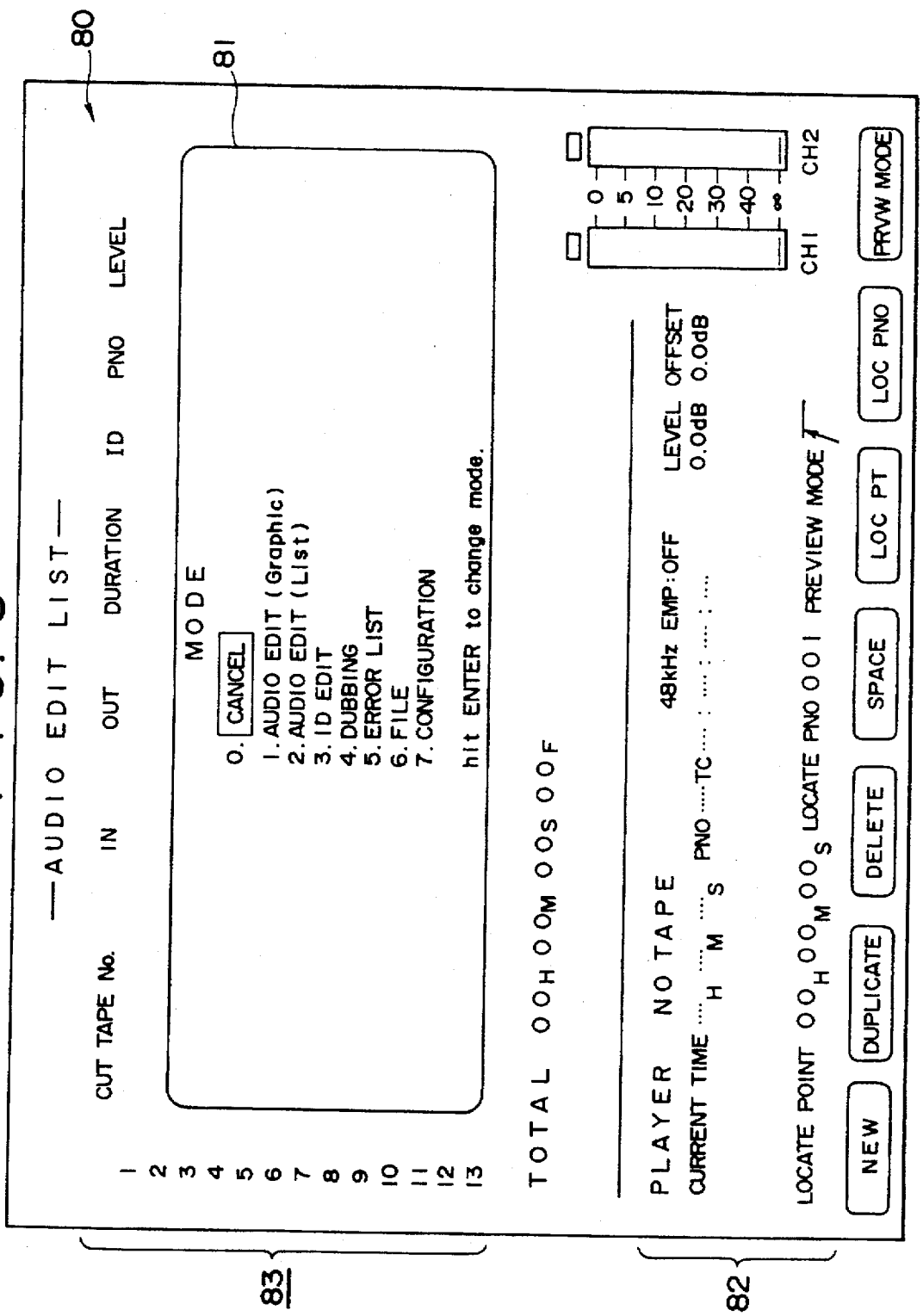
FIG. 6 is a view of a screen in effect when operating mode is designated.

On the screen 80 of FIG. 6, an area 82 shows graphically and numerically what the player 2 or the recorder 3 is doing. An area 83 displays the contents of an edit list also graphically and numerically. Watching the screen 80, the operator designates an operating mode with keys (step 13). The input of the operating mode is effected by use of numeric keys 75 or a shift key, not shown. The operating mode is selected from among a menu 81 of FIG. 6 containing various modes.

If the operating mode remains unchanged in step 11, i.e., if no key is operated after power-up, step 15 is reached immediately through step 14. This means that edit list producing mode is selected automatically. The operator may at once start producing an edit list (step 16). In edit list producing mode, the player 2 is controlled to produce the edit list for each cut. The contents of the edit list thus produced are displayed successively on the screen 80 (step 17).

To designate a mode other than edit list producing mode requires selecting that mode in the menu of FIG. 6. If audio edit mode is selected, audio signal editing is carried out automatically in step 18 of FIG. 1. In that case, the player 2 is placed automatically in reproducing mode and the recorder 3 in recording mode. According to the edit list, editing is carried out one cut at a time. The progress of the editing work is displayed on the screen 80 (step 19).

If ID edit mode is selected in step 14, step 23 or 26 is reached through steps 21 and 22. With R-DAT's, ID data are subordinate data which, furnished in addition to audio data, provide control information such as recording time, program number and recording characteristic regarding the audio data.

To produce an ID edit list requires using edited tapes. Thus if ID edit list producing mode is selected, the recorder 3 is controlled appropriately to produce the ID edit list. When the processing is in progress, ID data are updated, and the contents of the updated data are displayed successively on the screen 80 (steps 23 and 24). In ID edit list producing mode, the recorder 3 is controlled to produce the ID edit list for each cut.

If automatic ID edit mode is selected, the corresponding processing program is executed. This provides editing of ID data as per the ID edit list, and the contents of the edited ID data are displayed on the screen 80 (steps 26 and 27).

Although various other operating modes may be selected as shown in FIG. 6, these modes are not directly relevant to the invention and are thus omitted from the description hereunder.

How an audio edit list is produced will now be described with reference to FIGS. 2 and 3. The screen of FIG. 6 first appears when audio edit list producing mode is selected. An indication "NO TAPE" appears in the area 82 prompting the operator to load a recorded tape. With the tape loaded, the screen of FIG. 7 appears.

In the flowchart of FIG. 2 showing the audio edit list producing routine, a check is made following the loading of the tape to see if a transport operation command is input by use of keys on the console 4 (step 31). The transport in this context is a player operating mode such as play mode, cue mode and stop mode regarding the player 2.

If no transport operation command is found to be entered, the operating mode of the player 2 ("STOP") is displayed along with the length of the loaded tape (maximum recording time), the tape position in the stopped state, and the tape data read from the stopped position. These settings are read from the tape and displayed where appropriate on the screen 80 (steps 33, 34 and 35).

Figure 7:
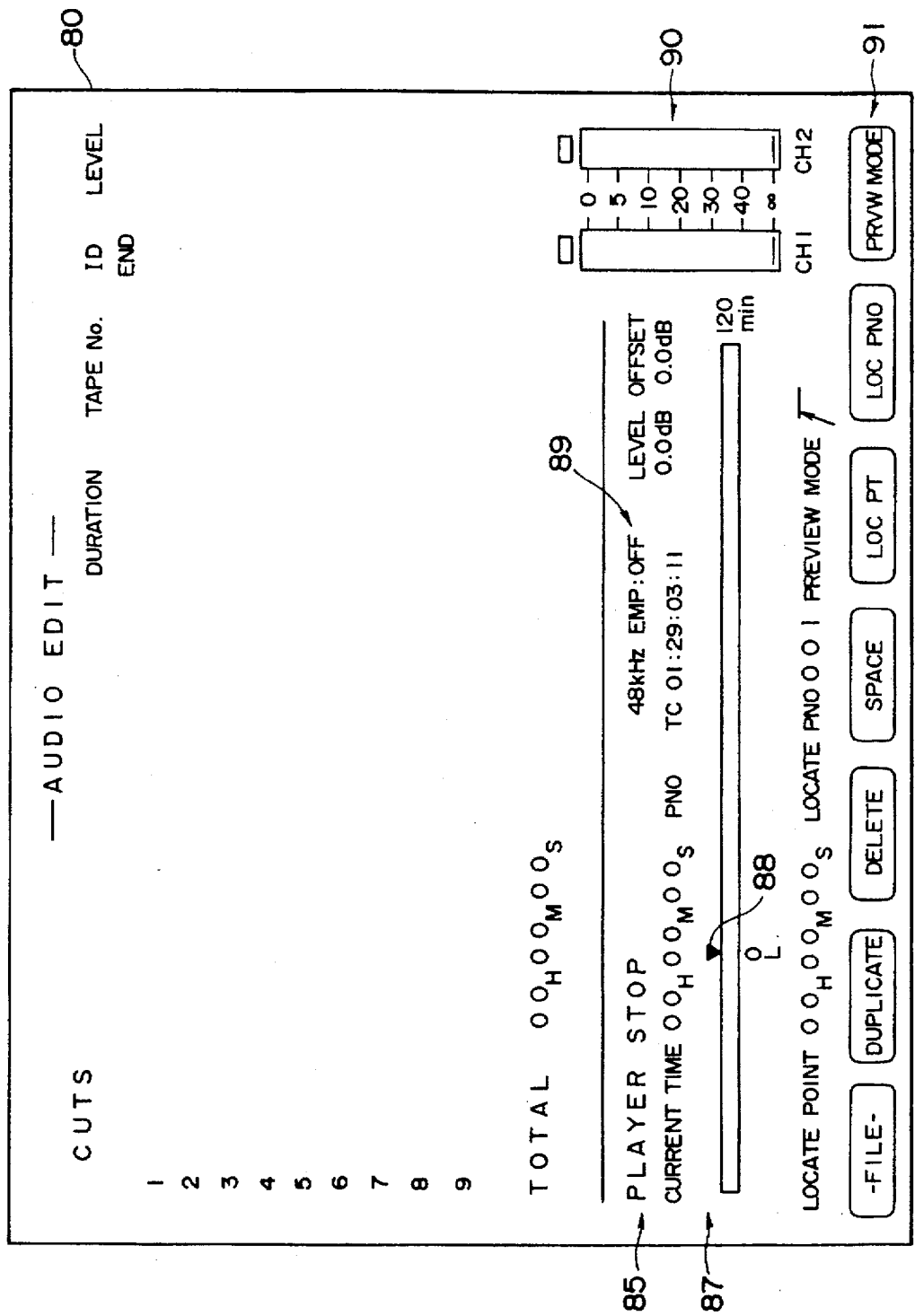
FIG. 7 is a view of a screen in effect when an audio signal edit list is to be produced.

FIG. 7 shows an example of the above display. An area 85 indicates the operating mode of the player 2, and an area 87 shows the recording time on the loaded tape (in minutes) and a corresponding bar graph. A mark 88 indicates the tape position at the time of loading. That position is taken as "0." An area 89 displays the data read from the tape (sampling frequency, presence or absence of emphasis, time code TC, etc.). An area 90 shows the reproducing levels of the left- and right-hand audio channels CH1 and CH2. An area 91 indicates function modes that correspond to the function keys 76 provided on the console 4.

If a transport operation command is found to be entered for the player 2 in step 31 of FIG. 2, the corresponding operating mode is activated. In or immediately after that operating mode, steps 32 through 35 are carried out. The results are displayed as shown in FIG. 7.

An editing section is then established. In this example, the editing point setting key 74c is used to designate an in-point and an out-point which define an editing section. Designation of the editing points must be preceded by selection of an operating mode for the player 2. A command for selecting an operating mode is entered in step 31.

Figure 8:
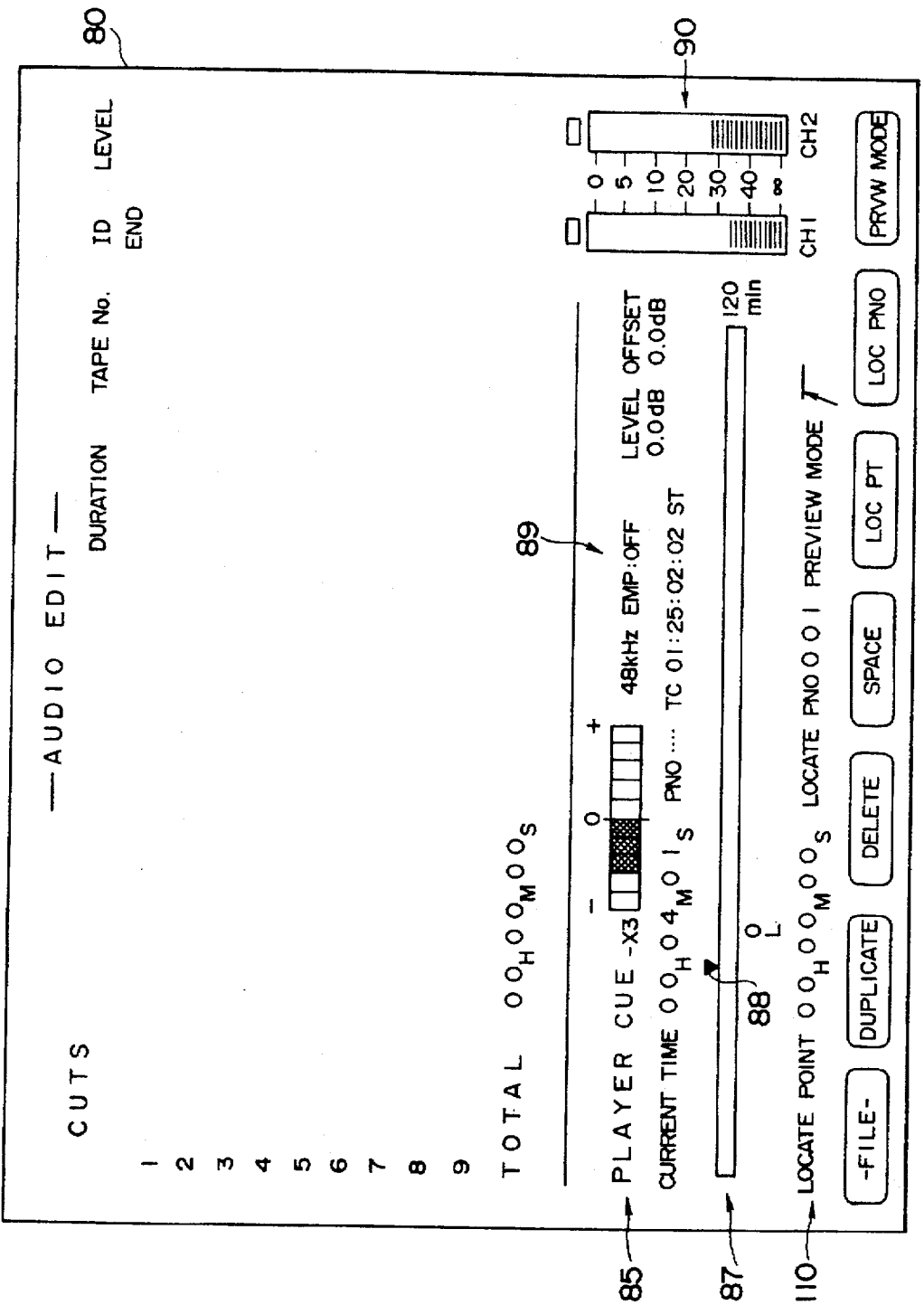
FIG. 8 is a view of another screen in effect when an audio signal edit list is to be produced.

FIG. 8 shows a typical screen given when the player 2 is placed in cue mode. In that operating mode, the data varying in real time (i.e., data given in steps 33 through 35) are calculated and displayed where appropriate (in areas 85, 87, 89 and 90) on the screen 80. The mark 88 appears to the left of the origin "0." This is because the forward direction is taken to the right. In the area 85, the tape speed in cue mode is also indicated (triple speed mode "X3" in FIG. 8). The area 87 also shows the running time (CURRENT TIME) starting from the origin "0".

When an in-point is determined, the editing point setting key 74c is clicked. The time data at that point are read from the tape (steps 36 and 37). If the reading of the time data is the first reading, step 39 is reached through step 38. In step 39, that new editing point is displayed on the screen.

Figure 9:
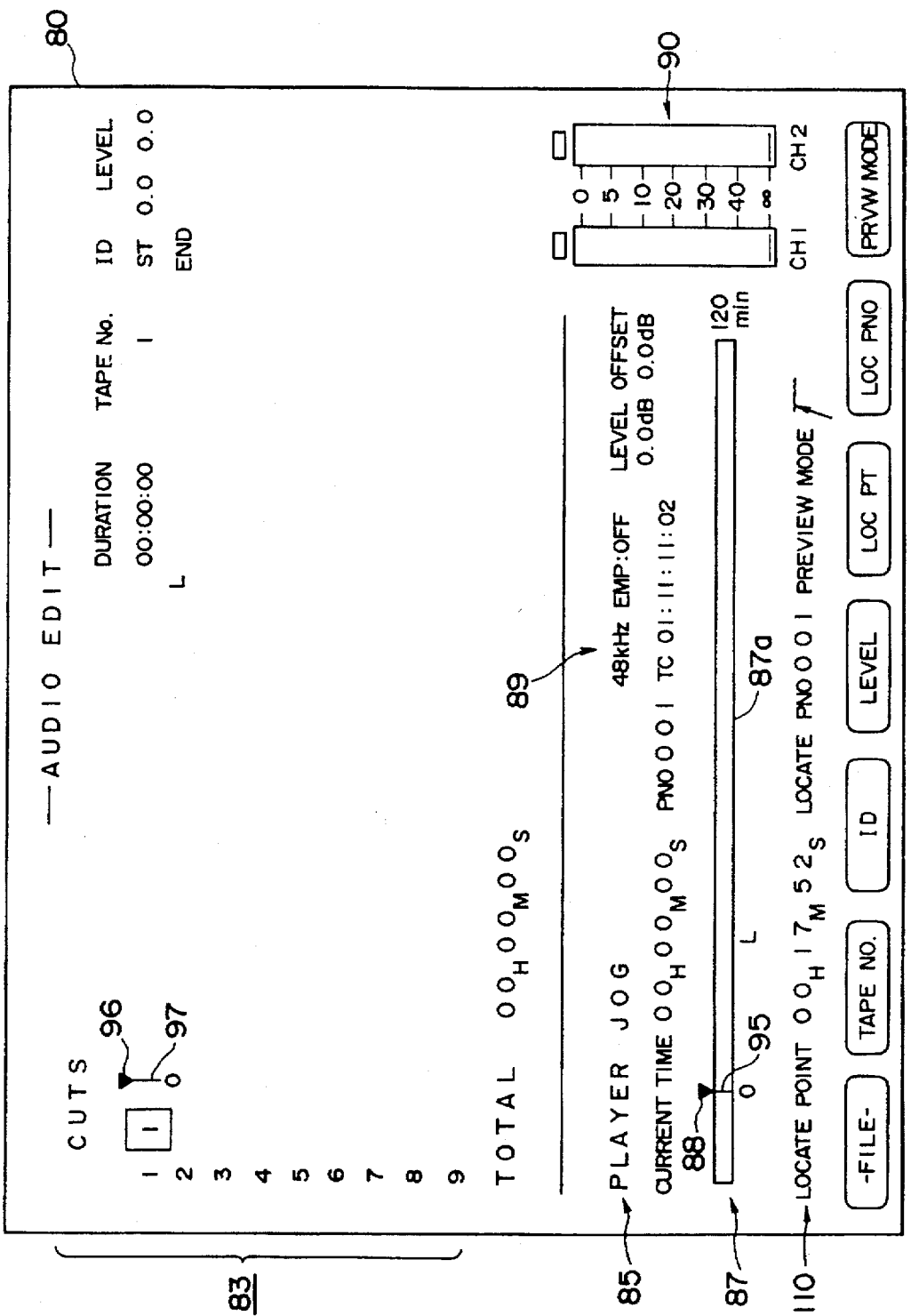
FIG. 9 is a view of another screen in effect when an audio signal edit list is to be produced.

FIG. 9 shows a typical screen given when an in-point is determined. With the in-point established, a white-on-black bar 87c within the area 87 shows a confirmation line 95 indicating the establishment of the in-point. The area 89 shows a time code (hours, minutes, seconds, frame) and a cut number (i.e., program number PNO) of the in-point, the latter indicating where the current cut is when counted from the first. An area 110 shows the time (LOCATE POINT) required until the position of the mark 88 (tape stop point) is reached. The above indications appear on the screen along with the edit list and an accumulated edit list (steps 46 and 47 in FIG. 3). In the area 83, the in-point having the cut number 1 is indicated by a mark 96 and a vertical line 97.

An out-point will now be established. If the player 2 is in jog mode when the in-point is established, steps 32 through 47 are carried out. During the process, various data are read from the tape and displayed in the areas 82 and 83.

Figure 10:
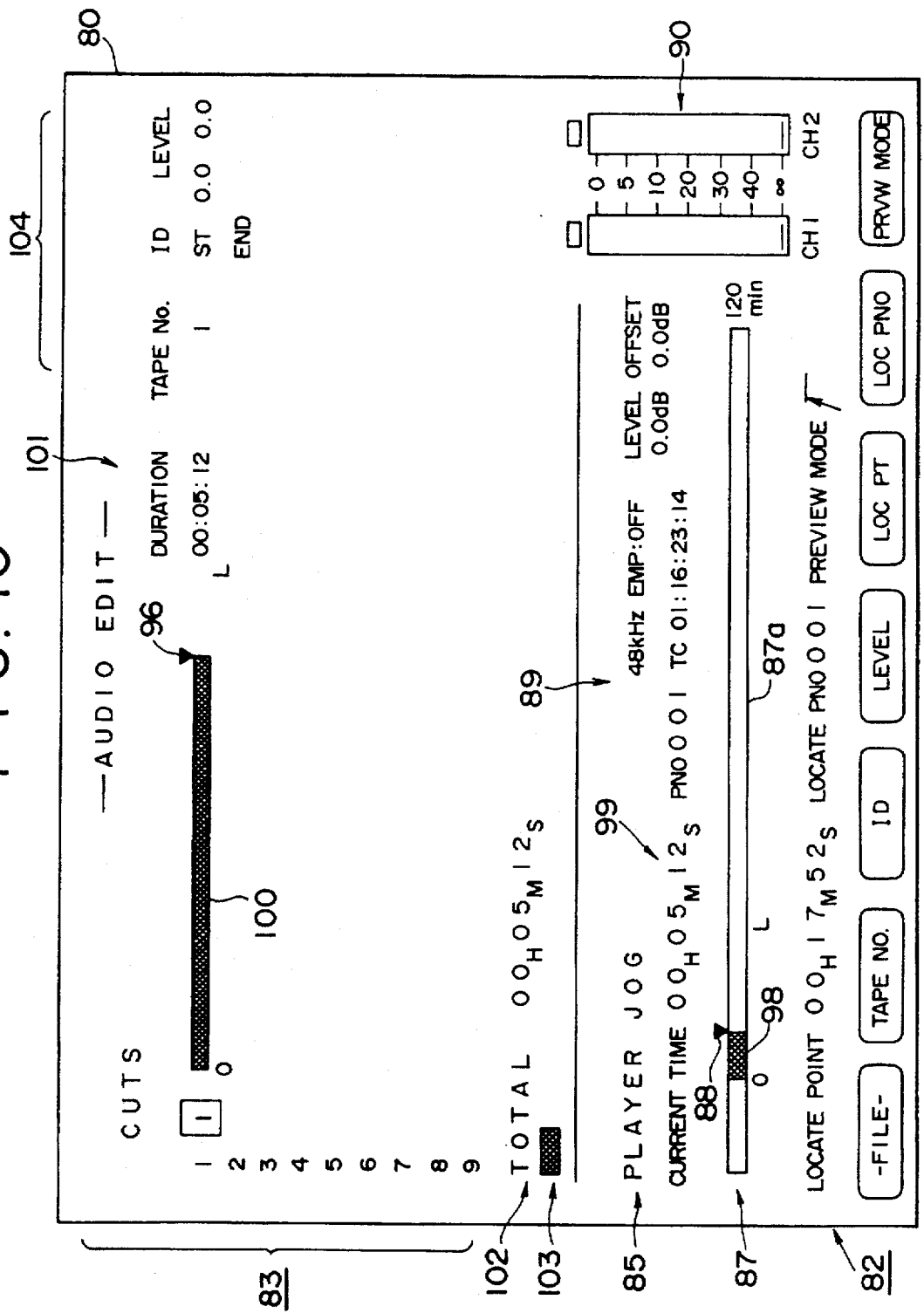
FIG. 10 is a view of another screen in effect when an audio signal edit list is to be produced.

As shown in FIG. 10, the area 82 indicates the time required from the in-point up to the current time (CURRENT TIME), the time code, and the total time of editing (LOCATE POINT). The bar 87c within the area 87 is displayed in black indicating the length (i.e., editing section length) 98 which varies with the movement of the mark 88 starting from the in-point.

In the area 83, the field of the program number 1 shows a black bar 100. An area 101 to the right of the bar 100 indicates the editing time of the editing section (noted as DURATION, i.e., time required between in- and out-points, equal to CURRENT TIME in the area 82). An area 104 displays the ID number of the loaded tape (NO. 1 in FIG. 10), part of the ID data, and recording levels of the left- and right-hand channels. An area 103 also shows the bar 100 in black and in a contracted manner.

When the out-point is determined, clicking the editing point setting key 74c reads the time data (e.g., time code data) at the new editing point (steps 36 and 37 in FIG. 2). If the reading of the time data is the second reading (step 38), the new and the old time data are compared (step 40).

If the second editing point is determined while the tape is being run in the forward direction, the new time data (second time data) become greater than the old. In that case, the first editing point is set as the in-point and the second as the out-point (steps 41 and 42).

If the second editing point is determined while the tape is being run in the same reverse direction as the first editing point, the new time data become smaller than the old. In that case, the first editing point is set as the out-point and the second as the in-point (steps 43 and 44 in FIG. 2). Thereafter, the editing section (i.e., section between the in- and the out-points) is calculated (step 45).

As described, it is only after the time data on two editing points have been read that one point is defined as the in-point and the other as the out-point. In the above description, the in-point is set first for the ease of explanation. That is, the editing point having the smaller time data is defined illustratively as the in-point.

Figure 11:
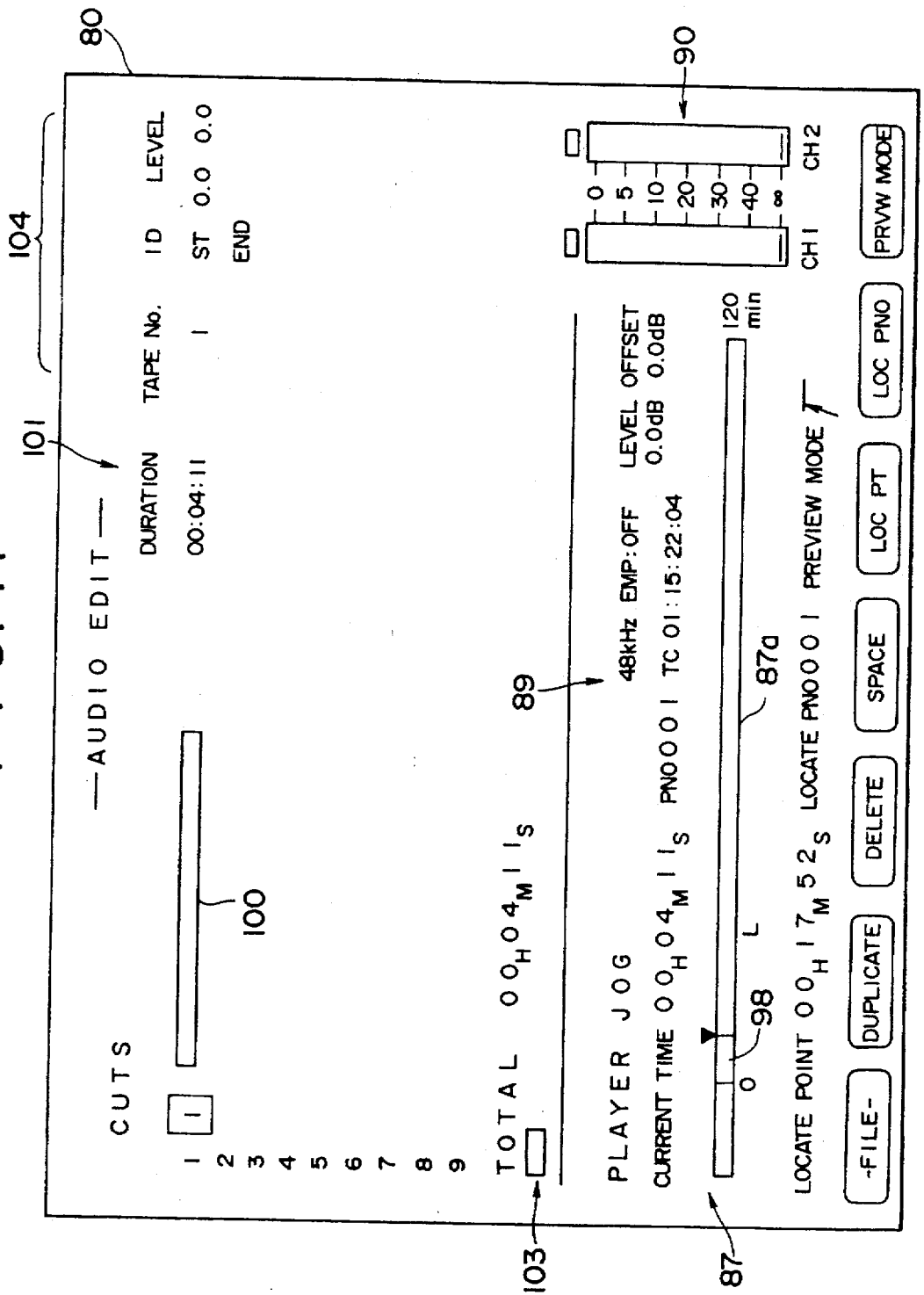
FIG. 11 is a view of another screen in effect when an audio signal edit list is to be produced.

The editing points for each cut are established by simply operating the editing section determining key 74e. Whether or not the key 74e is operated is judged in step 54 of FIG. 3. Once the editing section is established, the established editing section is displayed (step 55). A typical screen given in that state is shown in FIG. 11. With the editing section determined, the black bar becomes white on the screen. This makes it possible for the operator to verify visually that the editing points have indeed been established.

The above process of establishing the editing points is repeated for each cut, and an accumulated edit list covering the cuts involved is produced. In this case, step 74 of FIG. 3 displays the total contents of the accumulated edit list data.

Figure 12:
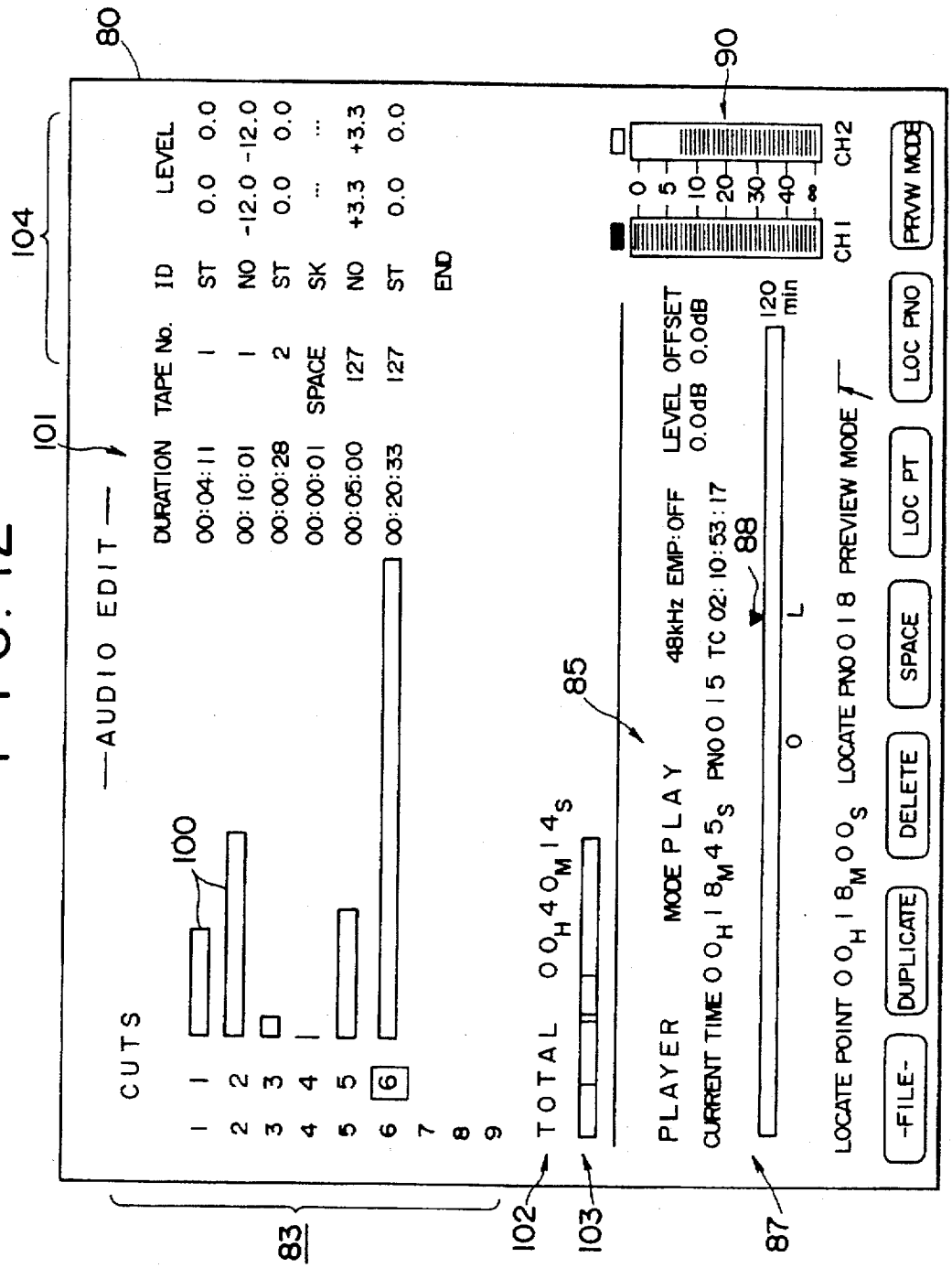
FIG. 12 is a view of another screen in effect when an audio signal edit list is to be produced.

FIG. 12 shows an example of displaying an accumulated edit list. The example of FIG. 12 involves one space (i.e., idle time) and five cuts edited consecutively. The area 83 indicates bars reflecting the lengths of the cuts (i.e., lengths of editing sections), along with the accumulated edit list comprising the editing time, tape number (identifying the tape used), ID data and audio levels relevant to each cut. An area 102 gives the total editing time in numeral and in bar graph fashion so that the total editing time is easy to verify.

Production of the above edit list, once completed, is followed by selection of another operating mode. Immediately after the completion of the edit list or during transition to the subsequent mode, the following processing may also be carried out.

Figure 3:
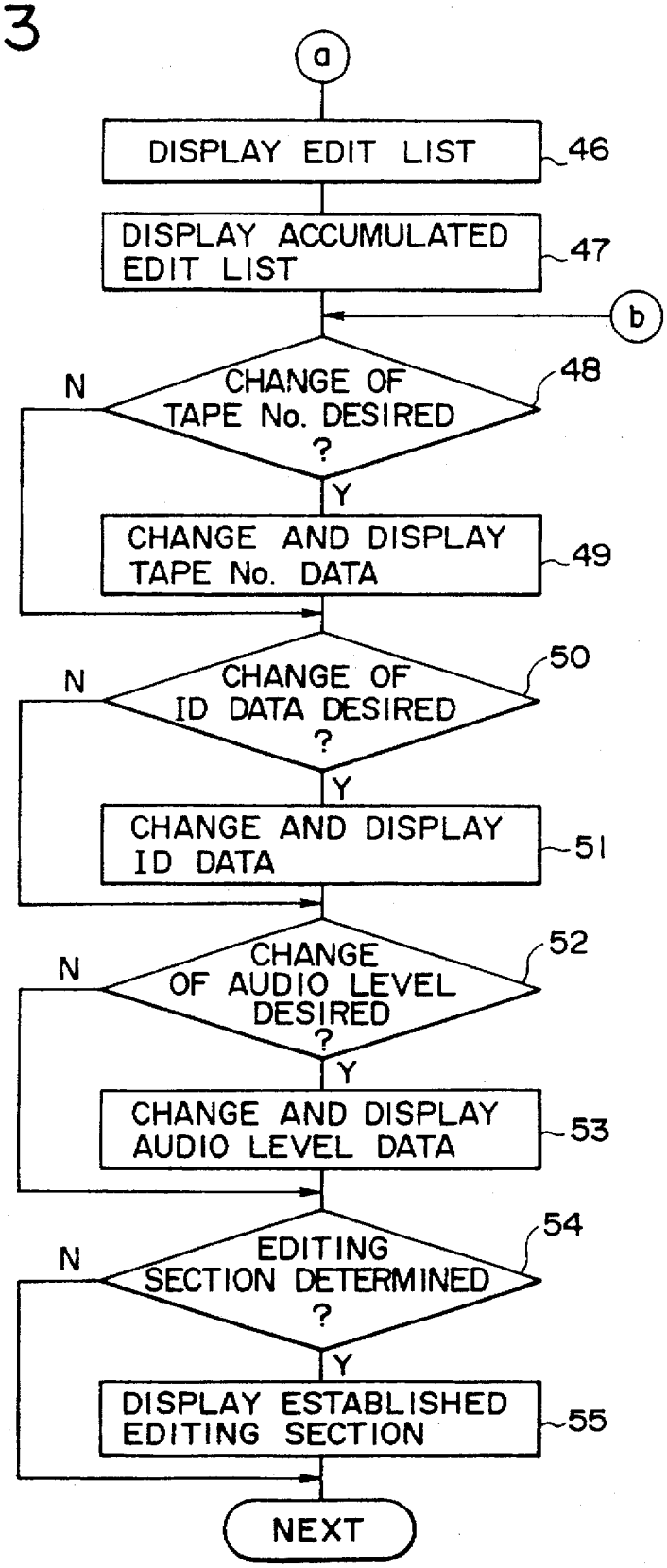
FIG. 3 is another flowchart of steps constituting the example of producing the audio signal edit list.

FIG. 3 illustratively outlines such processing. If it is desired to change the tape number for edit list production, numeric keys 75 are used to change the number. The changed number is displayed in the area 104 (steps 48 and 49).

Likewise, if it is desired to change the ID data on the tape, the data are changed and displayed (steps 50 and 51). Where the audio levels of the left- and right-hand channels need to be changed, they may also be changed and displayed (steps 52 and 53).

The changed tape number, ID data and audio levels are established by operating an appropriate key (step 54). The editing section determining key 74 may double as that key.

Figure 4:
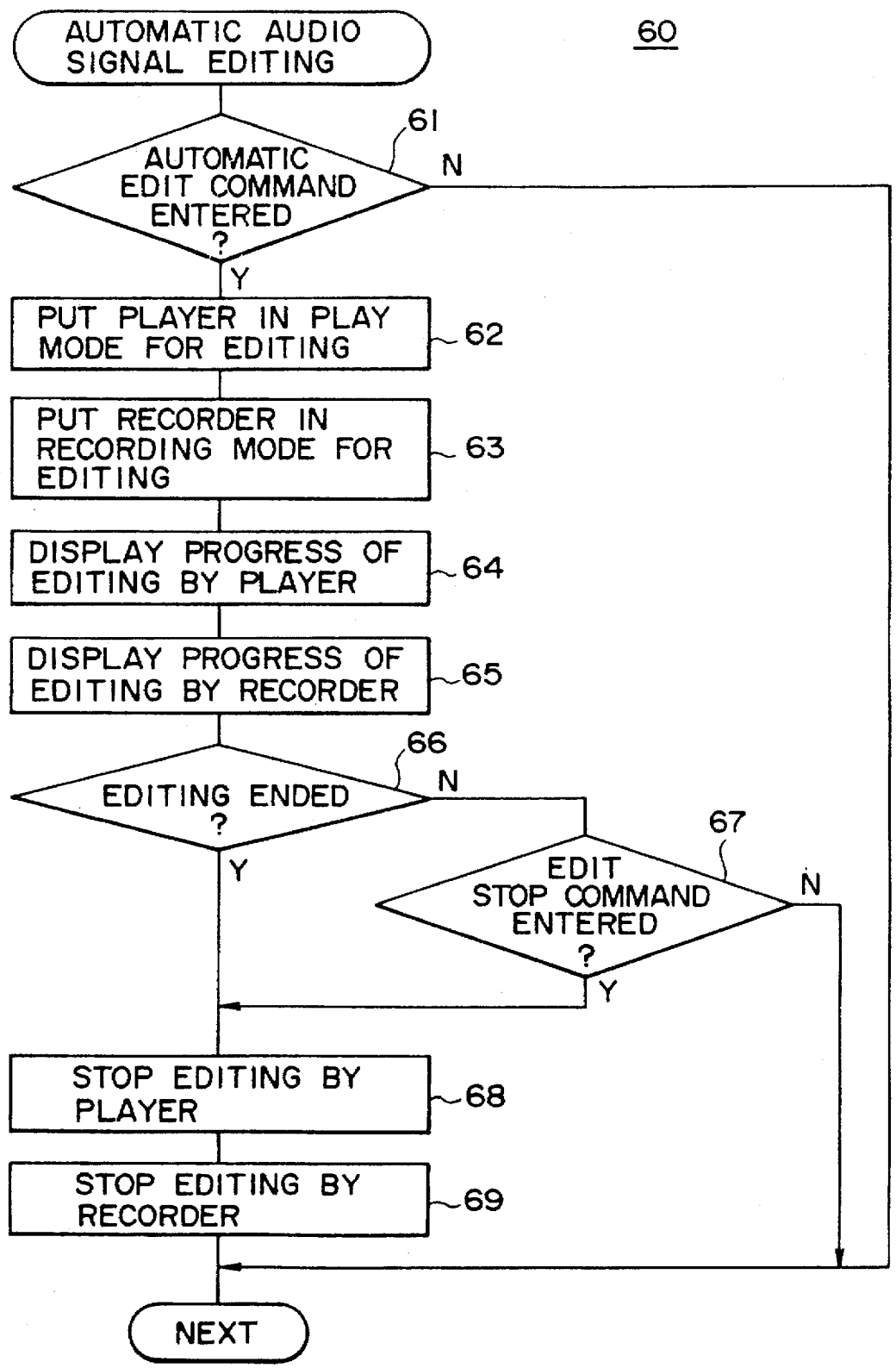
FIG. 4 is a flowchart of steps constituting an example of automatically editing audio signals.

FIG. 4 is a flowchart depicting an automatic audio signal editing routine. When automatic audio edit mode d (FIG. 1) is selected by operating the automatic editing key 74d (FIG. 5), the automatic audio signal editing routine of FIG. 4 is activated. In step 61, a check is made to see if an automatic edit command is entered. If the command is found to be entered, step 62 is reached. In step 62, the player 2 is placed automatically in play mode for editing. An appropriate tape is loaded in the player 2 as per the edit list.

In synchronism with the operation of the player 2, the recorder 3 is placed automatically in recording mode for editing (step 63). An unrecorded tape is loaded in the recorder 3. When both the player 2 and the recorder 3 are established in their operating modes, the automatic editing key 74d is operated. This starts editing work from the lowest program number upward, with audio signals read from player 2 and recorded to the recorder 3.

Figure 13:
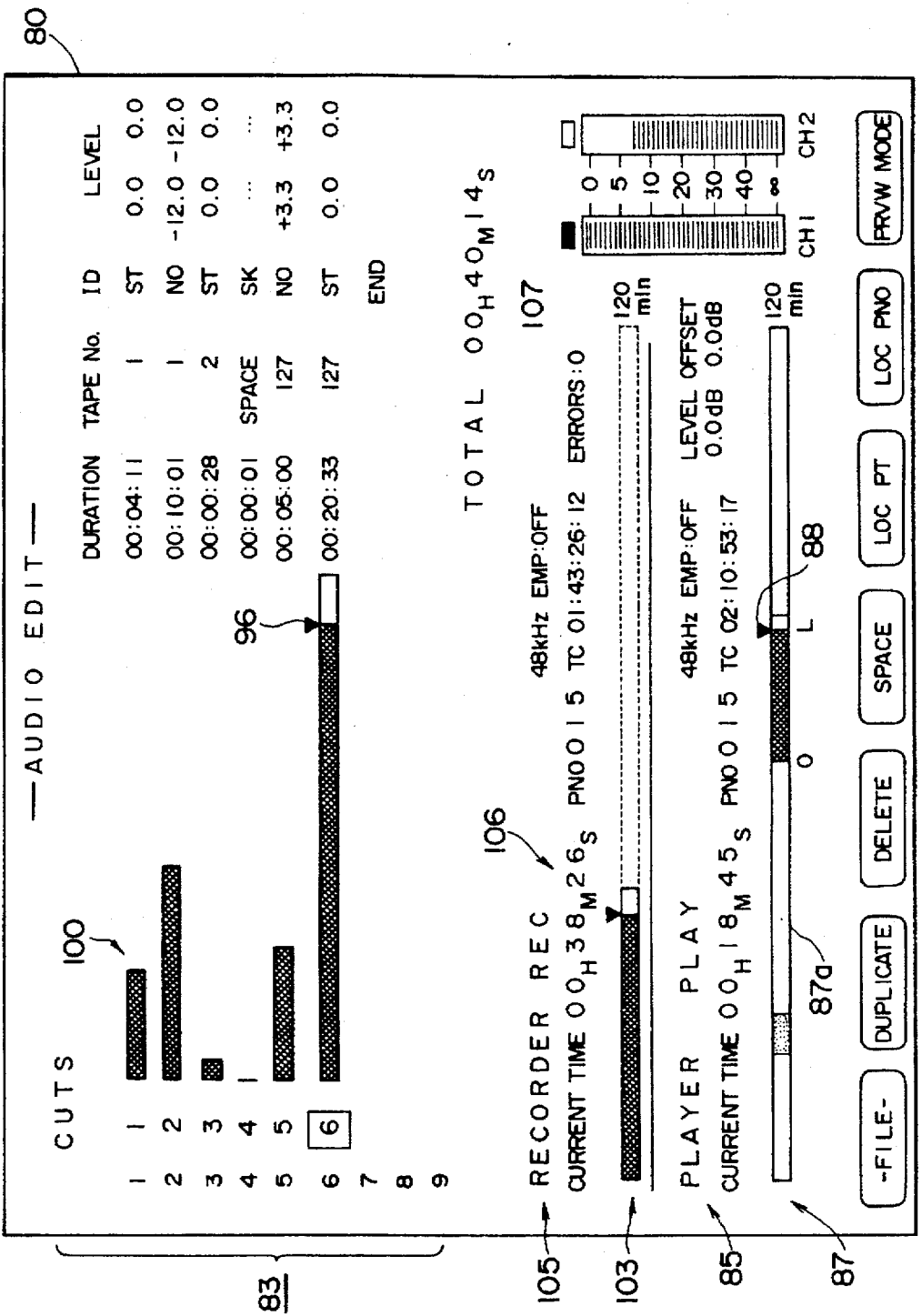
FIG. 13 is a view of a screen in effect when audio edit mode for automatic audio signal editing is selected.

During this dubbing operation, the progress on the part of the player 2 and that on the part of the recorder 3 are displayed on the screen 80. FIG. 13 shows a typical screen given when dubbing is in progress. The area 85 indicates the play mode in effect. In the area 87, dots filling the bar 87c stand for the editing sections having been dubbed so far from the tape reproduced. A section painted in black in the bar 87c indicates the editing section currently dubbed. These different kinds of display help ascertain in an easy and visual manner which editing section is being or has been dubbed.

The edit list indicating portion within the area 83 displays black-painted bar graphs corresponding to the edited programs as well as a white bar denoting the program part yet to be edited. The display allows the operator to see clearly which program number is being edited for the current cut.

The status of the recorder 3 is indicated below the area 83. That is, an area 105 shows the recording mode currently in effect, and an area 106 indicates the running time of the program currently edited along with the program number. Further below, a bar graph 107 shows the currently accumulated recording time as opposed to the maximum recording time (120 min.) of the tape loaded in the recorder 3. This allows the operator readily to verify whether or not all programs included in the edit list may be edited on the same tape. The bar graph 107 distinguishes the already edited portion of the section from the remaining portion thereof using different forms of display.

When all editing work is completed as per the edit list, the player 2 and the recorder 3 are stopped and are automatically placed in stop mode each (steps 68 and 69). If an edit stop command is entered halfway through editing, the editing operation is stopped at that point (step 67), and the player 2 and recorder 3 are put in stop mode each.

As described, the method and apparatus according to the invention produce an edit list beforehand and then edit audio signals in accordance therewith. This makes it possible to edit a plurality of cuts continuously and thus easily, whereas the prior art editing work typically involves selecting player and recorder modes alternately so that each editing section is determined and edited separately, one cut at a time.

According to the invention, the edit list is produced first. With the edit list completed, dubbing is carried out uninterrupted on all cuts involved. People unskilled in editing can perform editing operations easily and in a short time. Player and recorder modes are switched automatically for efficient editing. Unlike unwieldy prior art equipment, all editing devices are connected into an integral system that is easy to maneuver and convenient to use.

As many apparently different embodiments of this invention may be made without departing from the spirit and scope thereof, it is to be understood that the invention is not limited to the specific embodiments thereof except as defined in the appended claims.

What is claimed is:

1. A composing method for determining an editing section on a recording medium having signals including time code data recorded thereon, comprising the steps of:

operating an editing point setting device to fix a first editing point on said recording medium and determining a first time code thereof;

identically operating the same editing point setting device to fix a second editing point on said recording medium spaced apart from said first editing point and determining a second time code thereof;

comparing said first time code with said second time code to determine which of said first and second time codes is the smaller and which is the larger; and then storing as an in-point the one of said first and second editing points having the smaller time code and storing as an out-point the one of said first and second editing points having the larger time code.

2. A composing method according to claim 1, further comprising the step of displaying said editing section determined by said in-point and said out-point on a display screen.

3. A composing apparatus for determining an editing section on a recording medium having signals including time code data recorded thereon, comprising:

an editing point setting device operable for fixing a first editing point on said recording medium and determining a first time code thereof;

said same editing point setting device being identically operable for fixing a second editing point on said recording medium spaced apart from said first editing point and determining a second time code thereof;

comparing means for comparing said first time code with said second time code to determine which of said first and second time codes is the smaller and which is the larger; and storing means for then storing as an in-point the one of said first and second editing points having the smaller time code and for storing as an out-point the one of said first and second editing points having the larger time code.

4. A composing apparatus according to claim 3, further comprising displaying means for displaying said editing section determined by said in-point and said out-point on a display screen.

* * * * *